(12) United States Patent
Kim (10) Patent No.: US 11,017,672 B2
(45) Date of Patent: May 25, 2021

(54) SYSTEM AND METHOD FOR EXPANDING REAR SIDE ALARM AREA OF TRACTOR-TRAILER COMBINATION VEHICLE

(71) Applicant: MANDO CORPORATION, Gyeonggi-do (KR)

(72) Inventor: Dong Myeong Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/930,445

(22) Filed: May 13, 2020

(65) Prior Publication Data

US 2020/0372802 A1 Nov. 26, 2020

(30) Foreign Application Priority Data

May 23, 2019 (KR) .................. 10-2019-0060562

(51) Int. Cl.
*G08G 1/16* (2006.01)
*B60Q 9/00* (2006.01)
*B60R 11/04* (2006.01)
*G01S 13/931* (2020.01)

(52) U.S. Cl.
CPC .............. *G08G 1/167* (2013.01); *B60Q 9/008* (2013.01); *B60R 11/04* (2013.01); *G01S 13/931* (2013.01); *G01S 2013/9315* (2020.01); *G01S 2013/9322* (2020.01)

(58) Field of Classification Search
CPC ........ G08G 1/167; B60Q 9/008; B60R 11/04; G01S 13/931; G01S 2013/9322
USPC .................................. 340/431, 435
See application file for complete search history.

(56) References Cited

U.S. PATENT DOCUMENTS

| | | | | |
|---|---|---|---|---|
| 9,211,889 B1* | 12/2015 | Hoetzer | ................ | G01S 15/931 |
| 9,335,162 B2* | 5/2016 | Kyrtsos | ................ | B60W 30/00 |
| 9,910,151 B2* | 3/2018 | Cashier | ................ | G01S 7/40 |
| 10,393,862 B2* | 8/2019 | Cashier | ................ | G01S 13/72 |
| 10,481,255 B2* | 11/2019 | Prasad | ................ | G01S 13/878 |
| 10,780,893 B2* | 9/2020 | Di | ................ | B62D 15/0245 |
| 2008/0186204 A1* | 8/2008 | Buckley | ................ | G08G 1/167 |
| | | | | 340/901 |

(Continued)

FOREIGN PATENT DOCUMENTS

KR 10-2012-0114994 10/2012

OTHER PUBLICATIONS

Office Action dated May 13, 2020 for Korean Patent Application No. 10-2019-0060562 and its English machine translation by Google Translate.

*Primary Examiner* — Eric Blount
(74) *Attorney, Agent, or Firm* — Ladas & Parry, LLP (57) ABSTRACT

A rear side alarm area expansion method of a tractor-trailer combination vehicle according to the present invention includes determining whether a trailer is connected to a tractor using a rear side alarm sensor when a tractor-trailer combination vehicle travels, changing a normal mode to an expansion mode if it is determined that the trailer is connected to the tractor, adjusting a rear side alarm area based on a predetermined length of the trailer in the expansion mode, calculating an actual length Ym of the trailer, and resetting the rear side alarm area. According to the configuration of the present invention, since the alarm area is set on the basis of the actual length of the trailer, the vehicle may safely change lanes.

20 Claims, 8 Drawing Sheets

(56) References Cited

U.S. PATENT DOCUMENTS

| | | | | |
|---|---|---|---|---|
| 2011/0181457 A1* | 7/2011 | Basten | ............... | G01B 7/042 |
| | | | | 342/70 |
| 2014/0297129 A1* | 10/2014 | Lavoie | ............... | G01B 21/02 |
| | | | | 701/41 |
| 2016/0041258 A1* | 2/2016 | Cashler | ............... | G01S 7/521 |
| | | | | 342/70 |
| 2018/0356527 A1* | 12/2018 | Kozak | ............... | G01S 17/931 |
| 2020/0031276 A1* | 1/2020 | Noh | ............ | B60W 40/12 |

\* cited by examiner

SYSTEM AND METHOD FOR EXPANDING REAR SIDE ALARM AREA OF TRACTOR-TRAILER COMBINATION VEHICLE

CROSS-REFERENCE TO RELATED APPLICATION

This application claims priority to and the benefit of Korean Patent Application No. 2019-0060562, filed on May 23, 2019, the disclosure of which is incorporated herein by reference in its entirety.

BACKGROUND

1. Field of the Invention

The present invention relates to a system and method for expanding a rear side alarm area of a tractor-trailer combination vehicle, and more specifically, to a system and method for expanding a rear side alarm area of a tractor-trailer combination vehicle for supporting safe lane change of the tractor-trailer combination vehicle which travels while a trailer is connected to a rear side of a tractor for the purpose of moving a moving house, a camping car, a boat, a car which was in an accident, and other carriers, because a blind spot of a rear side alarm area is expanded due to the trailer.

2. Discussion of Related Art

Recently, as vehicles have become highly intelligent, various intelligent functions are performed using various sensors installed in the vehicles. Among them, there are blind spot detection (BSD) systems configured to monitor side and rear blind spots of the vehicles to warn when collision risks occur and lane change assist (LCA) systems to prevent collision with rear vehicles when changing lanes.

The BSD and LCA systems detect obstacles (approaching vehicles) on rear sides of the vehicles and warn drivers to recognize them or assist the drivers to safely change lanes.

However, in the case of a vehicle of which a rear is connected to a trailer such as a carrier, the system for detecting obstacles around the vehicle such as the BSD system and the LCA system has a problem that there is a high risk in that the trailer may collide with approaching vehicles when the vehicle changes lanes because an obstacle detection function is not provided for a rear side area increased by a length corresponding to that of the trailer.

(Patent document 1) Korean Patent Laid-Open No. 10-2012-0114994

SUMMARY OF THE INVENTION

The present invention is directed to automatically detecting whether a trailer is installed behind a vehicle and expanding an obstacle detection and alarm area around the vehicle at which the trailer is installed to increase an efficiency to detect an approaching vehicle.

The present invention is also directed to setting an alarm area on the basis of an actual length of a trailer because blind spots in which surrounding obstacles exist are generated due to the trailer, and an alarm area is objectively verified through actual measuring of the trailer.

The present invention is also directed to automatically checking whether a trailer is installed, calculating an actual length thereof even when a driver does not directly input the length, and setting and expanding an alarm area using a conventionally provided detecting device of the tractor without installing a separate detecting device.

According to an aspect of the present invention, there is provided a method of expanding a rear side alarm area of a tractor-trailer combination vehicle in which a tractor and a trailer are connected through a rotational shaft in order to safely change lanes, the method including expanding the rear side alarm area if it is determined that the trailer is connected to the tractor using an alarm sensor of the tractor and adjusting the alarm area to be expanded using the alarm sensor to match with an actual length and an actual width of the trailer.

According to another aspect of the present invention, there is provided a rear side alarm area expansion system of a tractor-trailer combination vehicle which includes a tractor configured to travel using its own power and a trailer connected to the tractor through a rotational shaft and one-sidedly moved by the tractor and in which the tractor rotates with respect to the trailer in a longitudinal direction thereof at a certain rotating angle α degree, and the rear side alarm area expansion system includes at least one rear camera installed at a rear side of the tractor, a plurality of ultrasonic sensors installed at the rear side of the tractor, and a controller configured to measure a rotating angle α degree using the rear camera and/or ultrasonic sensors and expand and adjust an alarm area.

According to still another aspect of the present invention, there is provided a rear side alarm area expansion method of a tractor-trailer combination vehicle including determining whether a trailer is installed using a rear side alarm sensor when a tractor-trailer combination vehicle initially travels, changing a general mode to an expansion mode if it is determined that the trailer is connected to the tractor, adjusting a rear side alarm area to a basic length (default value) of the trailer in the expansion mode, calculating an actual length Ym of the trailer, and resetting the rear side alarm area.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and methods of achieving the same will be clearly understood with reference to the following detailed examples. However, the present invention is not limited to the examples to be disclosed below, but may be implemented in various different forms. The examples are provided in order to fully explain the present invention and fully explain the scope of the present invention for those skilled in the art. The scope of the present invention is defined by the appended claims. Sizes or relative sizes of layers and regions in drawings may be exaggerated for clarity explanation. Throughout the specification, the same reference numbers refer to the same components.

Embodiments described in the specification will be described with reference to plan and cross-sectional views which are ideal conceptual views of the present invention. Therefore, forms of the drawings may be changed according to a manufacturing technology and/or tolerances. Accordingly, the embodiments of the present invention are not limited to the illustrated specific forms, but also include changes in form occurring according to a manufacturing process. Therefore, the regions illustrated in the drawing have conceptual properties, and shapes of the regions illustrated in the drawings are for describing specific shapes of components, but not for restricting the scope of the invention.

Herein, exemplary embodiments of a system for expanding a rear side alarm area of a trailer vehicle having an above-described configuration according to the present invention will be described with reference to the accompanying drawings in detail.

The present invention relates to an invention to automatically vary an alarm area of a rear side alarm system to correspond to a length of the trailer.

Figure 1:
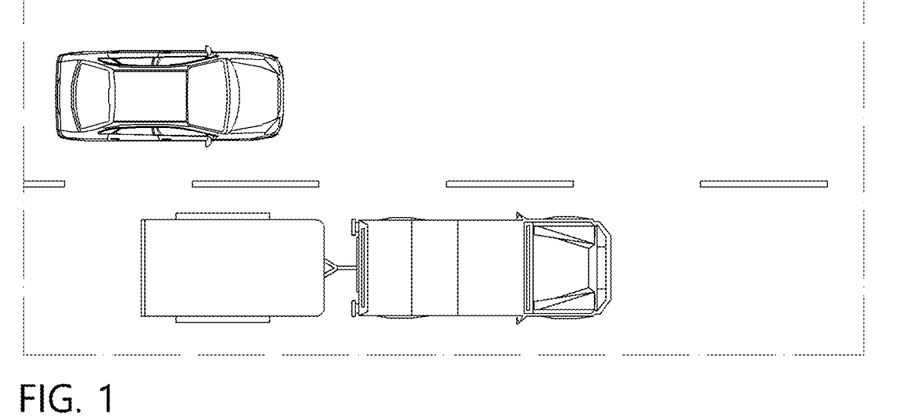
FIG. 1 is a conceptual view showing necessity of expanding a rear side alarm area of a tractor-trailer combination vehicle according to a conventional technology.
Figure 2:
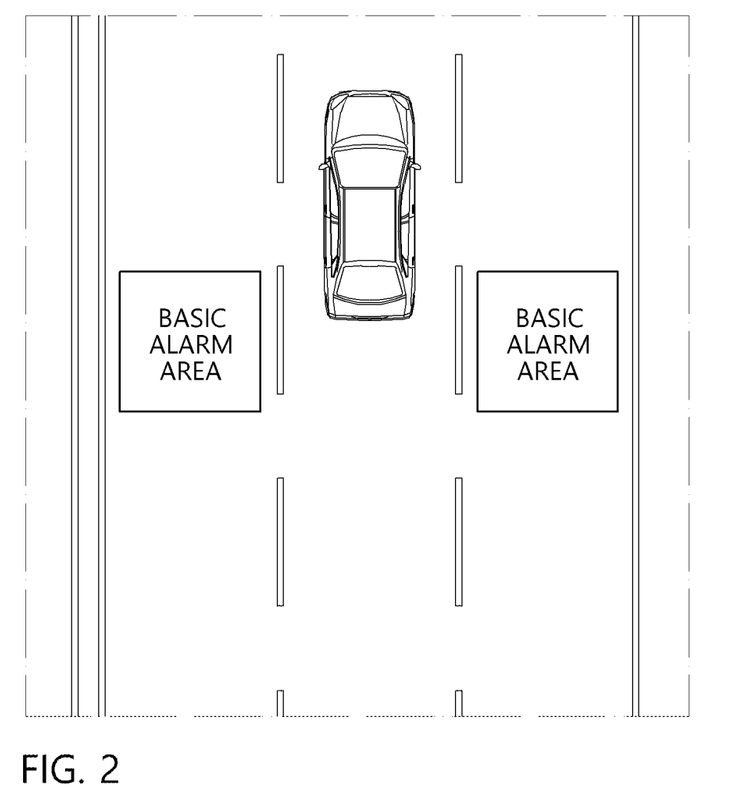
FIGS. 2 to 4 are configurational views illustrating basic alarm areas, expanded alarm areas, and variable alarm areas according to the present invention.

According to a rear side alarm system of a vehicle, an alarm area (see FIG. 2) in which whether there are obstacles behind a vehicle is checked when a lane is changed using cameras or sensors installed in the vehicle has to be set, and when there is a vehicle approaching the alarm area, the rear side alarm system prohibits the vehicle from changing lanes to induce safe traveling.

Such a basic alarm area may be set to 3.7 m from a side surface of the vehicle and 5.0 m from a rear surface of the vehicle, and when another vehicle approaches the alarm area, an alarm and the like are provided to prohibit changing lanes.

However, in a tractor-trailer combination vehicle according to the present invention, since a tractor and a trailer are connected through a rotational shaft, power is provided only to the tractor, and the trailer is dependently moved according to movement of the tractor, a general mode or expansion mode for an alarm area needs to be determined according to whether the trailer vehicle is installed thereat, and a general alarm area needs to be expanded by considering a size (length and width) of the trailer in the expansion mode.

Figure 3:
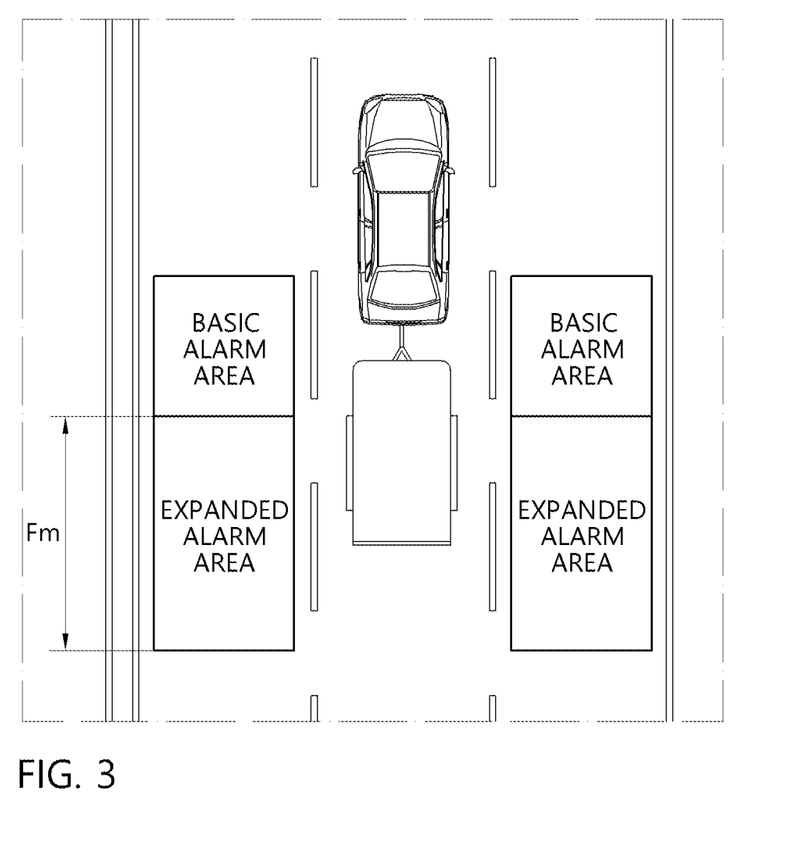

When the alarm area is changed in the expansion mode or the alarm area is actually expanded, a driver may directly determine the expansion mode and input an expanded alarm area (see FIG. 3) to control the rear side alarm system. However, since the driver has to input whether the trailer is installed to the tractor and a size of the trailer to the tractor, there is an inconvenience in that the drive has to additionally input related information about the trailer to the tractor. In addition, when the driver inputs incorrect information about the trailer to the tractor, a rear side alarm area may be fundamentally set incorrectly, and reliability related to rear side alarm may be reduced.

Meanwhile, an alarm area is not determined by an alarm sensor of the tractor, but by an alarm sensor of a trailer. In such a case, since a camera or sensor has to be installed at the trailer, the number of the components has to be correspondingly increased, and since a tractor and the trailer have to be connected through wired or wireless communication, the present invention does not use any alarm sensors installed at the trailer.

Therefore, in the present invention, information about the trailer is automatically measured using an alarm sensor provided in the tractor, and an alarm area is correspondingly adjusted. Accordingly, the driver may use the comfortable and reliable rear side alarm system regardless of whether the trailer is installed on the basis of the changed expanded alarm area (see FIG. 4).

Figure 5:
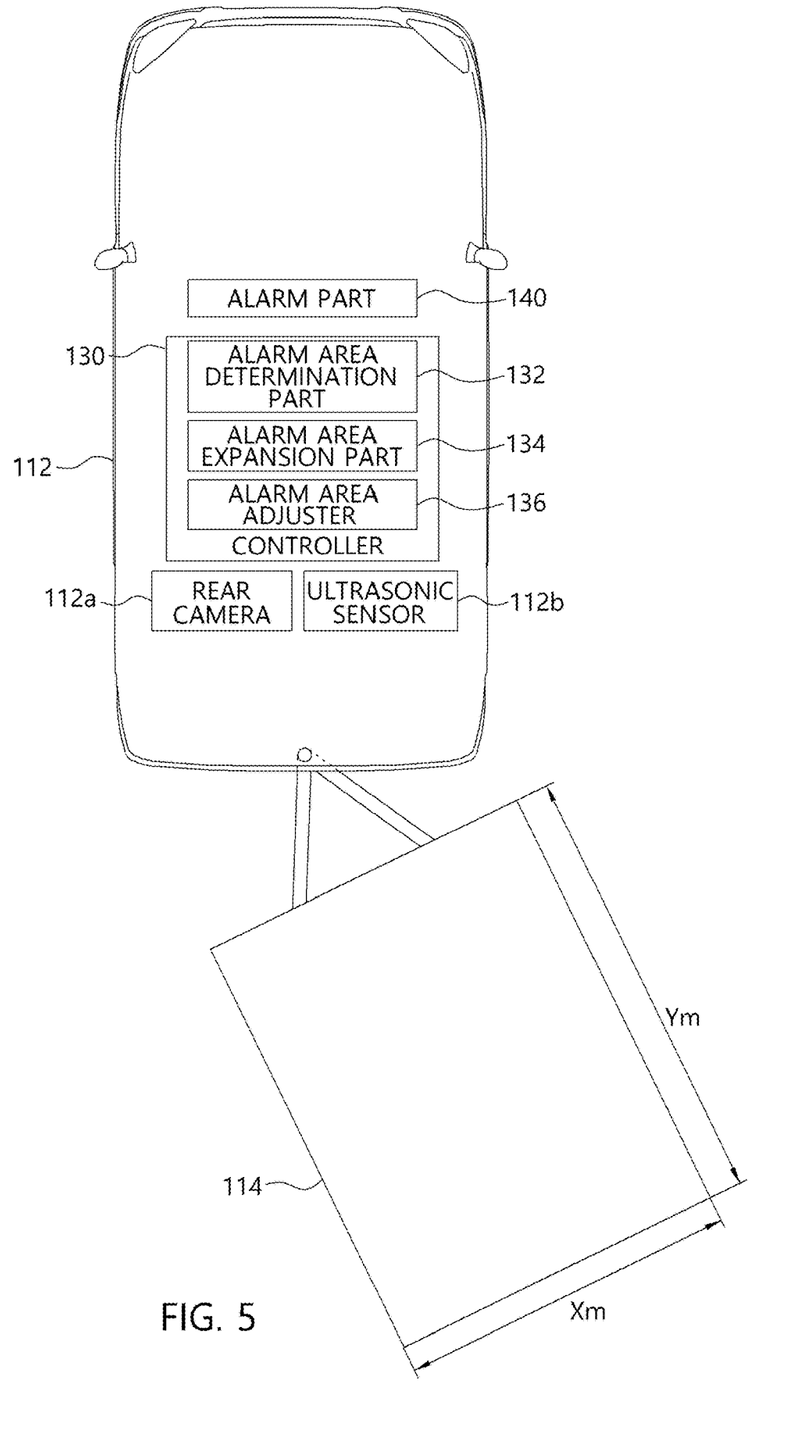
FIG. 5 is a block diagram illustrating a system for expanding a rear side alarm area of a tractor-trailer combination vehicle according to the present invention.

Referring to FIG. 5, in the tractor-trailer combination vehicle of the present invention, a rear side alarm area expansion system 100 includes the tractor-trailer combination vehicle in which a tractor 112 configured to move using its own power and a trailer 114 which is one-sidedly pulled by the tractor 112 are connected by a rotational shaft (or turntable). The tractor-trailer combination vehicle is designed such that the tractor 112 and the trailer 114 are rotatable in a longitudinal direction thereof at a rotating angle α degree around the rotational shaft.

The system 100 includes at least one rear camera 112a installed at a rear side of the tractor 112, a plurality of ultrasonic sensors 112b installed at the rear side of the tractor 112, and a controller 130 configured to measure the above-described rotating angle α degree using the rear camera 112a or ultrasonic sensors 112b and expand or adjust an alarm area. Accordingly, the trailer 114 does not include an additional detection device.

The above-described controller 130 includes an alarm area determination part 132 configured to determine whether the trailer 114 is installed, an alarm area expansion part 134 configured to expand the alarm area of the trailer 114 to a default length of the trailer 114, and an alarm area adjuster 136 configured to adjust the alarm area of the trailer 114 to correspond to an actual length of the trailer 114.

As described above, the controller 130 may calculate each of a first lateral distance Dm between a longitudinal center line of the tractor and a front edge of the trailer and a second lateral distance Cm between the longitudinal center line of the tractor and a rear edge of the trailer which are generated due to the rotation using a sine function of the rotating angle α degree.

Here, the rear camera 112a sets a width Xm of the trailer 114 before the trailer 114 rotates at the rotating angle α degree. After the trailer 114 rotates at the rotating angle α degree, the ultrasonic sensors 112b calculate a first longitudinal distance Am from a first front edge of the trailer to the tractor and a second longitudinal distance Bm from a second front edge of the trailer 114 to the tractor 112. Meanwhile, the rotating angle α may be determined by an arcsine function of a value in which a difference between the first and second longitudinal distances Am and Bm is divided by the width Xm of the trailer 114.

The system may further include an alarm part 140 configured to alert a driver that there is an obstacle in the expanded alarm area according to a result of the above-described alarm area expansion when the tractor 112 changes lanes.

To this end, a rear side alarm area expansion method of a tractor-trailer combination vehicle of the present invention includes a first operation of firstly expanding a rear side alarm area when whether the trailer 114 is installed is determined, and a second operation of secondly adjusting the alarm area to match the expanded alarm area to an actual length and an actual width of the trailer using the alarm sensors of the tractor 112.

Figure 6:
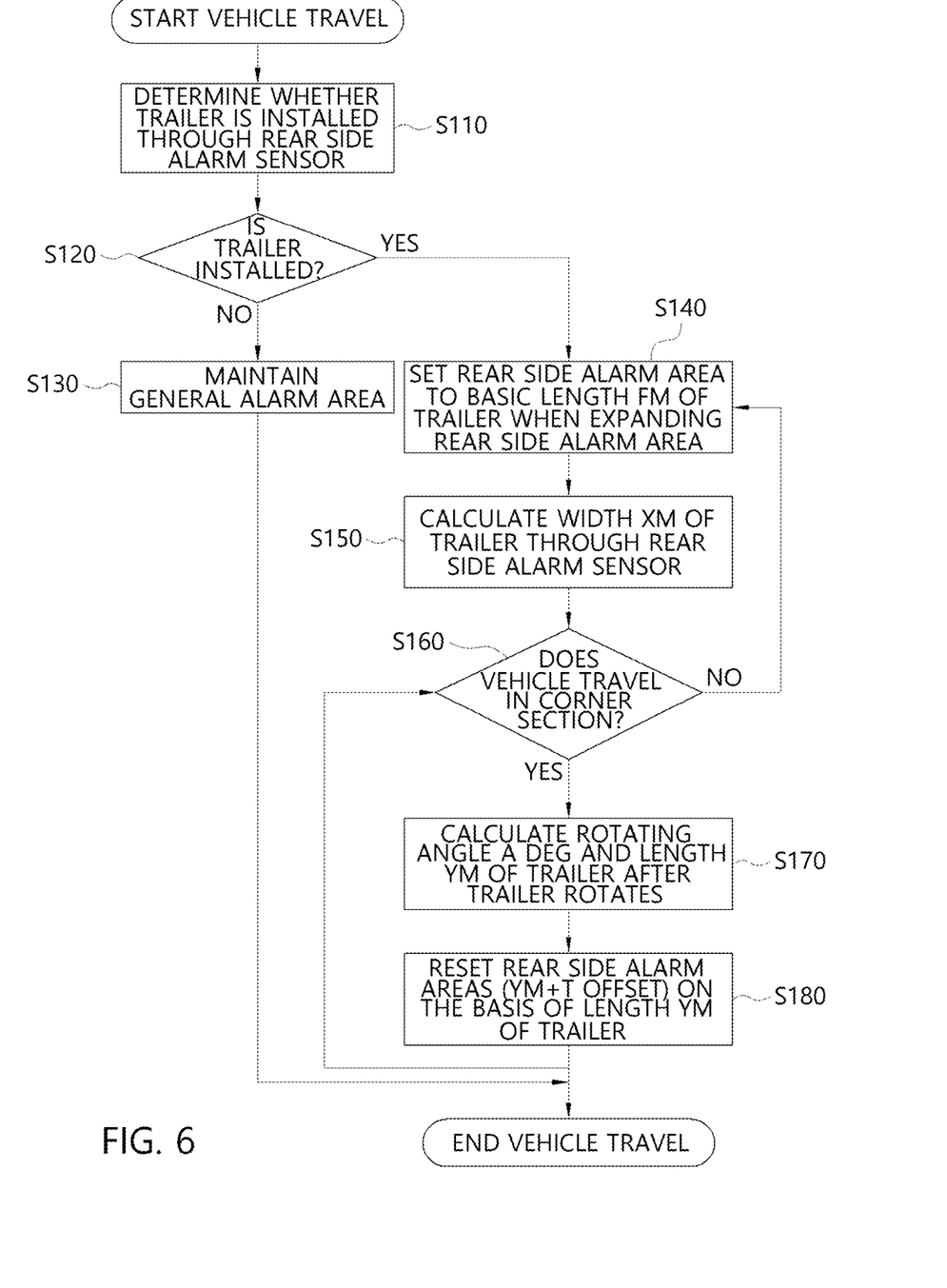
FIG. 6 is a flow chart illustrating a method of expanding a rear side alarm area of a tractor-trailer combination vehicle according to the present invention.

Referring to FIG. 6, the rear side alarm area expansion method of a tractor-trailer combination vehicle according to the present invention is a method of expanding the rear side alarm area of the trailer 114 connected to the tractor 112 through the rotational shaft and having a length Ym and the width Xm for safe traveling when changing lanes and includes the following operations.

When the tractor-trailer combination vehicle initially travels, whether the trailer 114 is installed is determined using a rear side alarm sensor including the rear camera 112a or the ultrasonic sensors 112b (S110).

When whether the trailer 114 is installed is determined (S120) and the trailer 114 does not exist, the general mode is set, and a general alarm area is maintained (S130).

When the trailer 114 exists, the general mode is changed to the expansion mode, and the rear side alarm area is expanded. Here, the rear side alarm area may be set to a default value of a predetermined length Fm of the trailer (S140). When it is assumed that a general length of the tractor 12 is 3 m, a general alarm area is set to 5 m, and a length of the trailer is 10 m, the expanded alarm area may be set to 15 m.

Figure 7:
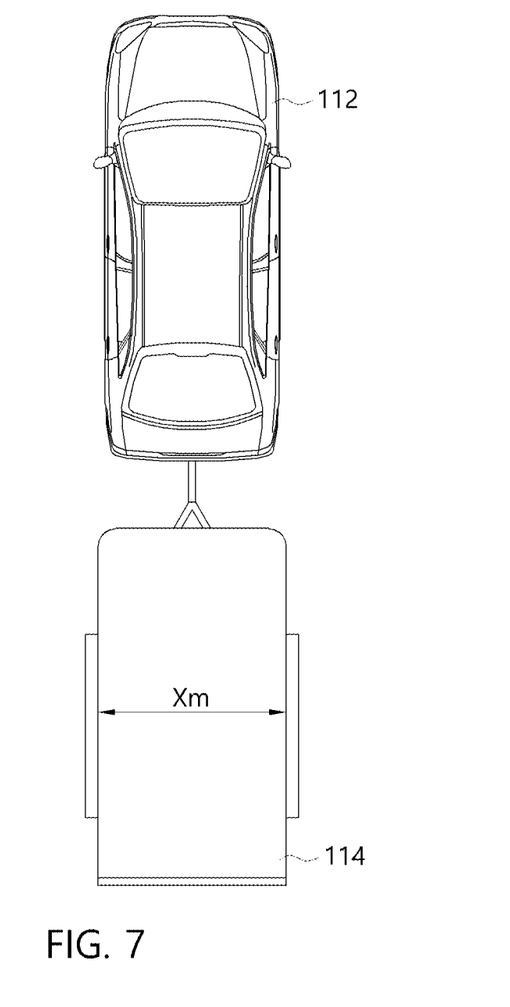
FIG. 7 is a conceptual view for describing a method of calculating a width Xm of a trailer according to the present invention.

Referring to FIG. 7, the width Xm of the trailer may be calculated using the rear camera 112a (see FIG. 5) or the ultrasonic sensors 112b (see FIG. 5) (S150). Since a method of calculating a length using a camera or an ultrasonic sensor is already known technology, a description will be omitted in this specification. For example, a distance may be measured using a parallax of a dual camera, and a width may be calculated using the distance.

Figure 8:
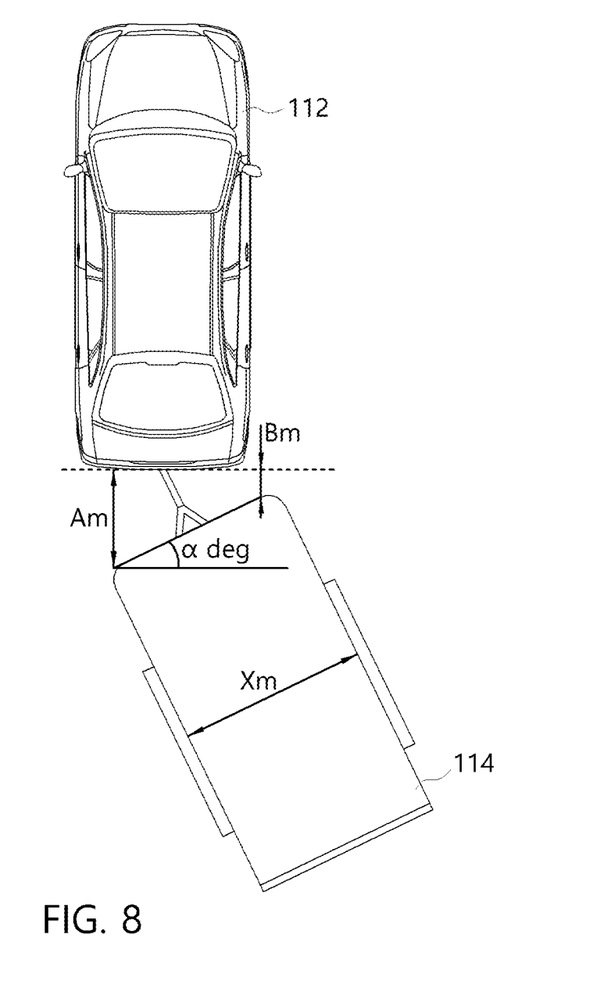
FIG. 8 is a conceptual view for describing a method of calculating a rotating angle α degree of the trailer according to the present invention.

Referring to FIG. 8, whether the tractor-trailer combination vehicle travels in a corner section is determined (S160). Since the tractor 112 moves using its own power and the trailer 114 connected thereto through the rotational shaft is one-sidedly pulled, the tractor 112 rotates relatively with respect to the trailer 114 in a longitudinal direction of the trailer 114 at a certain rotating angle α degree.

When the trailer 114 rotates, the first and second longitudinal distances Am and Bm from both ends of the trailer 114 to the tractor 112 are calculated using the ultrasonic sensors 112b, the rotating angle α degree of the trailer 114 may be calculated using Equation 1, $$\alpha\ deg = a\sin\frac{Am - Bm}{X}. \qquad (S170)$$

Figure 9:
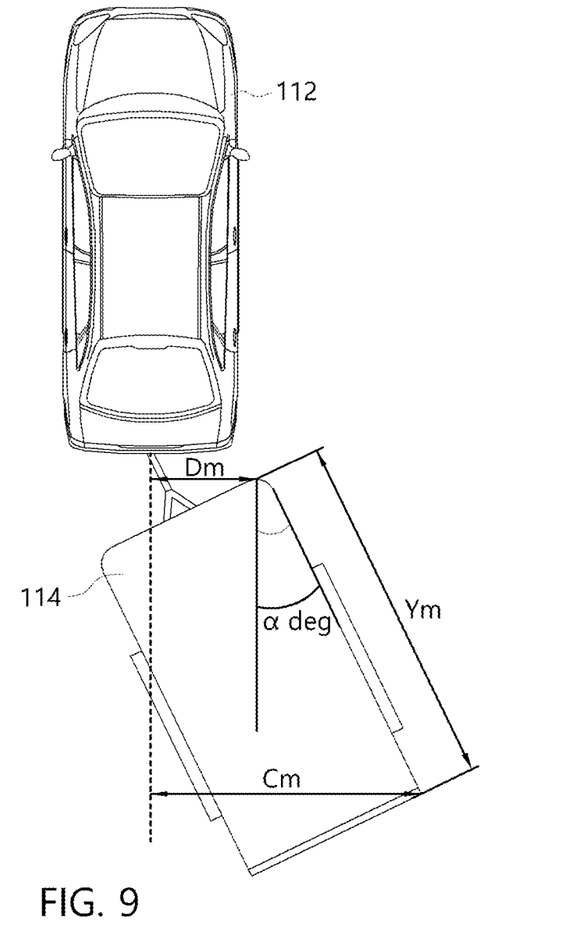
FIG. 9 is a conceptual view for describing a length Ym of the trailer according to the present invention trailer.

Referring to FIG. 9, after the first lateral distance Dm between the longitudinal center line of the tractor and the front edge and the second lateral distance Cm between the longitudinal center line of the tractor and the rear edge of the trailer 114, which are generated due to rotation of the trailer 114, are calculated using the rear camera 112a, the length Ym of the trailer may be calculated using Equation 2, $$Y\ m = \frac{Cm - Dm}{\sin(\alpha\ deg)}. \qquad (S170)$$

Figure 4:
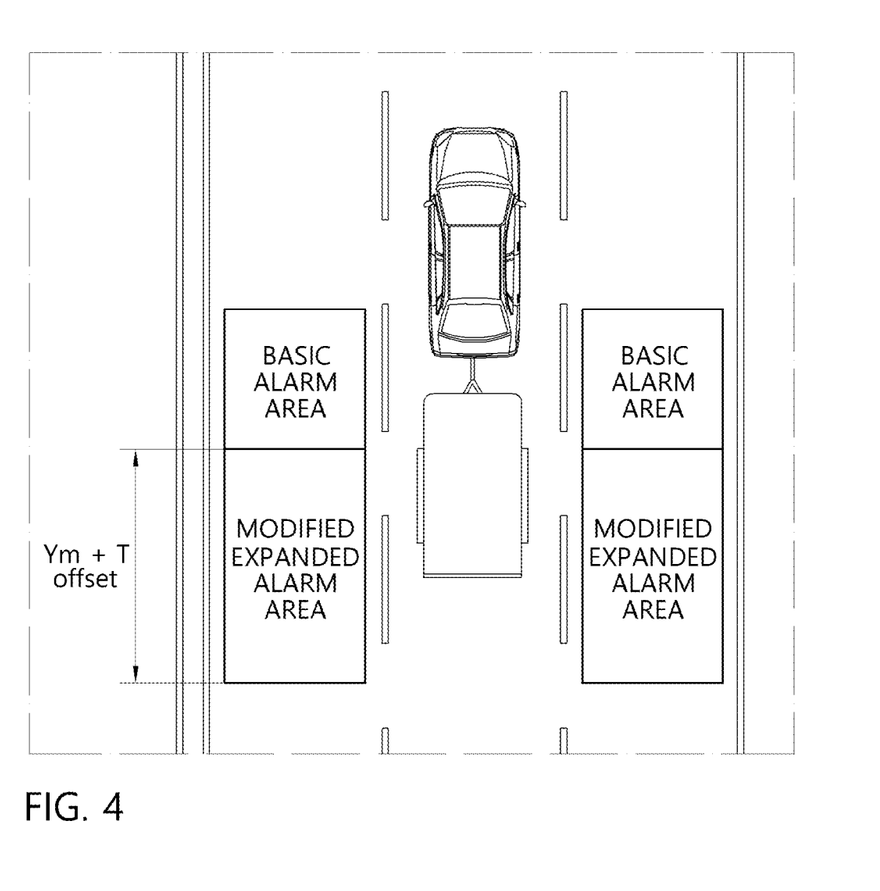

Further referring to FIG. 4, the rear side alarm area may be set using the length of the trailer Ym and Formula 3, Ym+T offset (S180).

For example, various pieces of length information about the lengths Am, Bm, Cm, and Dm may be calculated using the rear camera 112a or the ultrasonic sensors 112b, and the length Ym of the trailer may be calculated using the predetermined equation and used to adjust the alarm area.

As described above, in a case in which the trailer rotates about the tractor, even in a state in which the tractor and the trailer are not arranged in a longitudinal direction thereof, a rotating angle may be calculated using only the rear camera and the ultrasonic sensors of the tractor, and the length of the trailer may be calculated using the arcsine function of the rotating angle and the like, and thus it can be seen that the present invention has a technical spirit in which the alarm area is adjusted on the basis of the actual length of the trailer. The present invention may be variously modified by those skilled within a range of the basic technical spirit of the present invention.

According to the above-described present invention, the following effects can be expected.

First, since whether a trailer exists is determined using only a rear camera and an ultrasonic sensor originally included in a tractor, a driver does not need to additionally operate a system, and since a separate detecting device for determining whether the trailer exists does not need to be provided, the numbers of components and processes decrease.

Second, in a case in which the trailer rotates about the tractor, since a rotating angle is calculated using only the rear camera and the ultrasonic sensor of the tractor, and a length of the trailer is calculated using an arcsine function of the rotating angle and the like even in a state in which the tractor and the trailer are not arranged in a longitudinal direction thereof, an alarm area can be adjusted on the basis of an actual length of the trailer even without separate hardware so that the reliability for the alarm area is improved.

What is claimed is:

1. A method of expanding a rear side alarm area of a tractor-trailer combination vehicle in which a tractor and a trailer are connected through a rotational shaft in order to safely change lanes, the method comprising:
    expanding the rear side alarm area if it is determined that the trailer is connected to the tractor using alarm sensors of the tractor including a rear camera and an ultrasonic sensor;
    in a state that the trailer is not rotated, detecting an actual width of the trailer the rear camera;
    after that the trailer is rotated, calculating and actual length of the trailer based on a rotating angle of the trailer calculated using the ultrasonic sensor and a first lateral distance between a longitudinal center line of the tractor and a front edge of the trailer and a second lateral distance between the longitudinal center line of the tractor and a rear edge of the trailer; and
    adjusting the alarm area to be expanded based on the actual length and the actual width of the trailer.

2. The method of claim 1, wherein the expanding of the alarm area includes setting a predetermined length to a default length of the trailer.

3. The method of claim 2, wherein the adjusting of the alarm area includes changing the default length of the trailer to the actual length of the trailer on the basis of information about the trailer received from the alarm sensor.

4. A rear side alarm area expansion system of a tractor-trailer combination vehicle which includes a tractor configured to travel using its own power and a trailer connected to the tractor through a rotational shaft and one-sidedly moved by the tractor and in which the tractor rotates with respect to the trailer in a longitudinal direction thereof at a rotating angle, the rear side alarm area expansion system comprising:
  at least one rear camera installed at a rear side of the tractor;
  a plurality of ultrasonic sensors installed at the rear side of the tractor; and
  a controller configured to:
  measure the rotating angle of the trailer by detecting a width of the trailer using the rear camera in a state that the trailer is not rotated, calculating a first longitudinal distance from a first front edge of the trailer to the tractor and a second longitudinal distance from a second front edge of the trailer to the tractor using the ultrasonic sensors after the trailer rotates, and calculating the rotating angle of the trailer based on the detected width of the trailer and the calculated first and second longitudinal distances, and
  expand and adjust an alarm area based on the measured rotating angle of the trailer.

5. The rear side alarm area expansion system of claim 4, wherein the controller is configured to:
  determine whether the trailer is connected to the tractor;
  expand the alarm area of the trailer based on a default length of the trailer; and
  adjust the alarm area of the trailer to match with an actual length of the trailer.

6. The rear side alarm area expansion system of claim 5, wherein the controller calculates each of a first lateral distance between a longitudinal center line of the tractor and a front edge of the trailer and a second lateral distance between the longitudinal center line of the tractor and a rear edge of the trailer which are generated due to the rotation using a sine function of the rotating angle.

7. The rear side alarm area expansion system of claim 6, wherein:
  the rear camera sets the width of the trailer before the trailer rotates at the rotating angle;
  the ultrasonic sensor calculates the first longitudinal distance from the first front edge of the trailer to the tractor and the second longitudinal distance from the second front edge of the trailer to the tractor after the trailer rotates at the rotating angle; and
  the controller determines the rotating angle using an arcsine function of a value in which a difference between the first and second longitudinal distances is divided by the width of the trailer.

8. A rear side alarm area expansion method of a tractor-trailer combination vehicle comprising:
  determining whether a trailer is connected to a tractor using a rear side alarm sensor when a tractor-trailer combination vehicle travels;
  changing a normal mode to an expansion mode if it is determined that the trailer is connected to the tractor;
  adjusting a rear side alarm area based on a predetermined length of the trailer in the expansion mode;
  calculating an actual length of the trailer based on a rotating angle of the trailer and a first lateral distance between a longitudinal center line of the tractor and a front edge of the trailer and a second lateral distance between the longitudinal center line the tractor and a rear edge of the trailer, using at least one of a rear camera or an ultrasonic sensor; and
  resetting the rear side alarm area based on the actual length of the trailer.

9. The rear side alarm area expansion method of claim 8, wherein the calculating of the actual length of the trailer includes:
  setting a width of the trailer using at least one of the rear camera or the ultrasonic sensor before the trailer rotates;
  calculating a first longitudinal distance from a first front edge of the trailer to the tractor and a second longitudinal distance from a second front edge of the trailer to the tractor through at least one of the rear camera or the ultrasonic sensor;
  calculating a rotating angle of the trailer using Equation 1;

$$\alpha\ deg = a\sin\frac{Am - Bm}{X}$$

$$\alpha = a\sin\frac{Am - Bm}{Xm},$$

where $\alpha$ is a rotating angle of the trailer, Am is the first longitudinal distance, Bm is the second longitudinal distance, and Xm is the width of the trailer;
  calculating the first lateral distance between the longitudinal center line of the tractor and the front edge of the trailer and the second lateral distance between the longitudinal center line of the tractor and the rear edge of the trailer which are generated due to the rotation; and
  calculating the actual length of the trailer using Equation 2:

$$Y\ m = \frac{Cm - Dm}{\sin(\alpha\ deg)}$$

$$Ym = \frac{Cm - Dm}{\sin(\alpha)},$$

where Ym is the actual length of the trailer, Cm is the second lateral distance, Dm is the first lateral distance, and $\alpha$ is the rotating angle of trailer.

10. The rear side alarm area expansion method of claim 9, wherein:
  the resetting of the rear side alarm area includes resetting the rear side alarm area using the actual length of the trailer and Formula 3: Ym+T offset, where Ym is the actual length of trailer; and
  the actual length Ym of the trailer is greater than the predetermined length of the trailer.

11. A method of expanding a rear side alarm area of a tractor-trailer combination vehicle in which a tractor and a trailer are connected through a rotational shaft in order to safely change lanes, the method comprising:
  expanding the rear side alarm area if it is determined that the trailer is connected to the tractor using alarm sensors of the tractor;
  detecting an actual width of the trailer using at least one of the alarm sensors;

calculating an actual length of the trailer based on a rotating angle of the trailer, and a first lateral distance between a longitudinal center line of the tractor and a front edge of the trailer and a second lateral distance between the longitudinal center line of the tractor and a rear edge of the trailer; and adjusting the alarm area to be expanded based on the calculated actual length and the detected actual width of the trailer.

12. The method of claim 11, wherein the expanding of the alarm area includes setting a predetermined length to a default length of the trailer.

13. The method of claim 12, wherein the adjusting of the alarm area includes changing the default length of the trailer to the actual length of the trailer on the basis of information about the trailer received from the alarm sensors.

14. A rear side alarm area expansion system of a tractor-trailer combination vehicle which includes a tractor configured to travel using its own power and a trailer connected to the tractor through a rotational shaft and one-sidedly moved by the tractor and in which the tractor rotates with respect to the trailer in a longitudinal direction thereof at a rotating angle, the rear side alarm area expansion system comprising:

at least one rear camera installed at a rear side of the tractor;

a plurality of ultrasonic sensors installed at the rear side of the tractor;

a controller configured to measure the rotating angle of the trailer by detecting a width of the trailer using the rear camera in a state that the trailer is not rotated, calculating a first longitudinal distance from a first front edge of the trailer to the tracker and a second longitudinal distance from a second front edge of the trailer to the tracker using the ultrasonic sensors after the trailer rotates, and calculating the rotating angle of the trailer based on the detected width of the trailer and the calculated first and second longitudinal distances, and expand and adjust an alarm area; and the controller includes an alarm area determination part configured to determine whether the trailer is connected to the tractor.

15. The rear side alarm area expansion system of claim 14, wherein the controller includes:

an alarm area expansion part configured to expand the alarm area of the trailer based on a default length of the trailer.

16. The rear side alarm area expansion system of claim 14, wherein the controller includes:

an alarm area adjuster configured to adjust the alarm area of the trailer to match with an actual length of the trailer.

17. The rear side alarm area expansion system of claim 16, wherein the controller calculates each of a first lateral distance between a longitudinal center line of the tractor and a front edge of the trailer and a second lateral distances between the longitudinal center line of the tractor and a rear edge of the trailer which are generated due to the rotation using a sine function of the rotating angle.

18. The rear side alarm area expansion system of claim 17, wherein:

the rear camera sets the width of the trailer before the trailer rotates at the rotating angle α degree;

the ultrasonic sensor calculates the first longitudinal distance from a first front edge of the trailer to the tractor and a second longitudinal distance from a second front edge of the trailer to the tractor after the trailer rotates at the rotating angle; and the controller determines the rotating angle using an arcsine function of a value in which a difference between the first and second longitudinal distances is divided by the width of the trailer.

19. A rear side alarm area expansion method of a tractor-trailer combination vehicle comprising:

determining whether a trailer is connected to a tractor using a rear side alarm sensor when a tractor-trailer combination vehicle travel;

changing a normal mode to an expansion mode if it is determined that the trailer is connected to the tractor;

adjusting a rear side alarm area based on a predetermined length of the trailer in the expansion mode;

setting a width Xm of the trailer using at least one of a rear camera or an ultrasonic sensor before the trailer rotates;

calculating a first longitudinal distance Am from a first front edge of the trailer to the tractor and a second longitudinal distance Bm from a second front edge of the trailer to the tractor through at least one of the rear camera or the ultrasonic sensor;

calculating a rotating angle α degree of the trailer using Equation 1, $$\alpha \ deg = a\sin\frac{Am - Bm}{X};$$

calculating a first lateral distance Dm between a longitudinal center line of the tractor and a front edge of the trailer and a second lateral distance Cm between a longitudinal center line of the tractor and a rear edge of the trailer which are generated due to the rotation;

calculating the actual length Ym of the trailer using Equation 2, $$Y\ m = \frac{Cm - Dm}{\sin(\alpha \ deg)};$$

and resetting the rear side alarm area based on the actual length of the trailer.

20. The rear side alarm area expansion method of claim 19, wherein:

the resetting of the rear side alarm area includes resetting the rear side alarm area using the actual length Ym of the trailer and Formula 3, Ym+T offset;

the predetermined length Fm is set to F meters; and the actual length Ym of the trailer is greater than the F meters.

* * * * *